Patented May 22, 1951

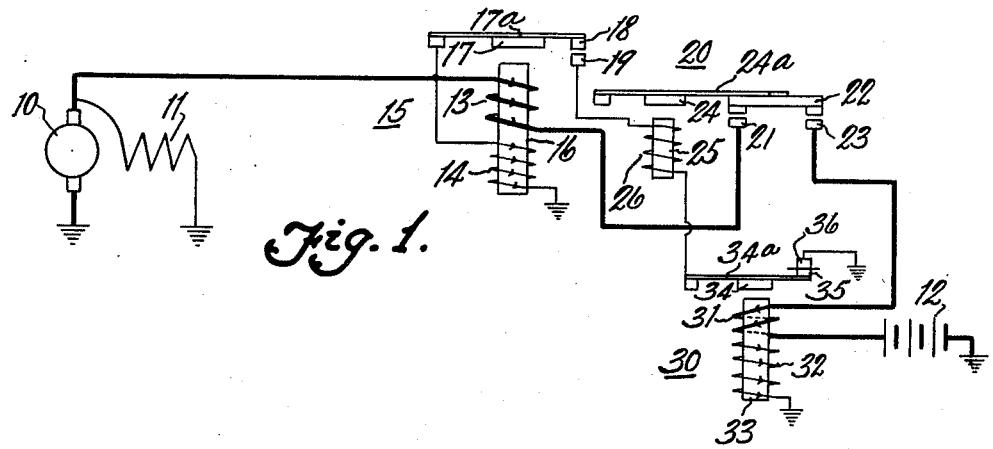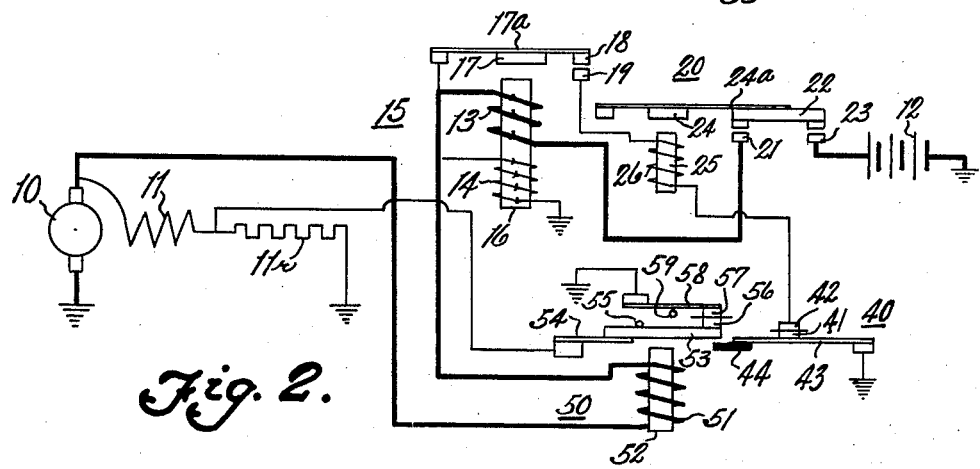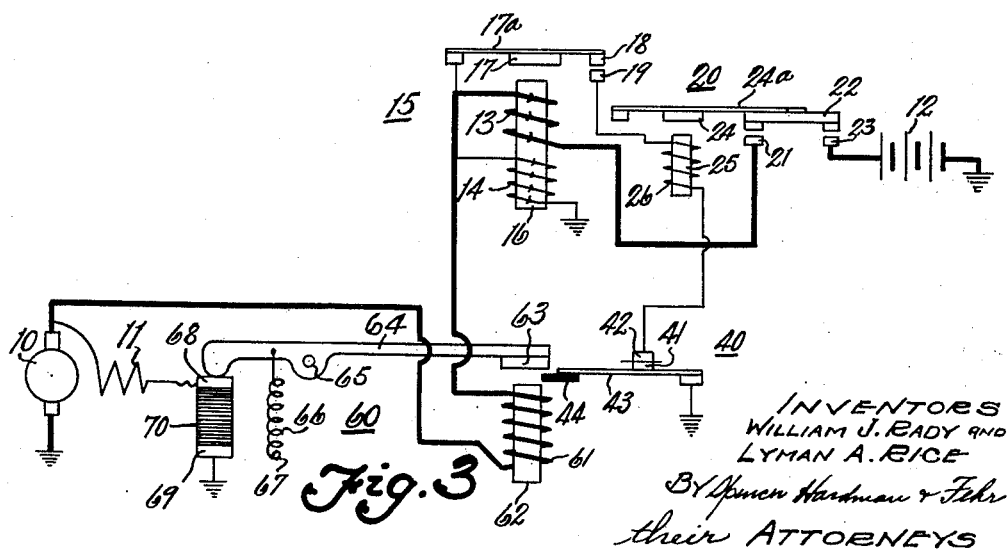

2,554,383

UNITED STATES PATENT OFFICE 2,554,383

BATTERY CHARGING SYSTEM

William J. Rady and Lyman A. Rice, Anderson, Ind., assignors to General Motors Corporation, Detroit, Mich., a corporation of Delaware Application June 9, 1949, Serial No. 97,958

4 Claims. (Cl. 320—33)

This invention relates to electric generating and battery charging systems for use on automotive vehicles and, more particularly, in a system in which the current output of the generator is relatively high and in which the vehicle engine, even when idling drives the generator at such speed that it charges the battery. It has been the practice to prevent discharge of the storage battery when generator voltage decreases to a value below battery counter voltage by the use of a reverse current relay. When the current output is large, the reverse current relay controls energization of the magnet coil of a circuit breaker whose contacts are connected directly into the battery charging circuit. It sometimes happens that reverse current can build up faster than the reverse current relay can respond with the result that the contacts of the reverse current relay and the contacts of the circuit breaker remain closed. This condition arises when the decay of generator voltage is so fast that the reverse current does not have time to effect separation of its contacts in response to the initial flow of reverse current. A generator designed for high current output has relatively low armature resistance and inductance; and, therefore, the time constant of reduction of voltage is relatively low and reverse current can build up relatively fast. Fast reduction of voltage of such a generator can occur when (a) the generator is stopped when the vehicle is stopped while the transmission between the engine and vehicle is still in direct drive, (b) when there is a broken field connection, (c) when there is even a momentary grounding of a generator terminal or (d) when a field terminal is grounded. The grounding referred to can occur accidentally when some adjustment is being made while the engine is idling.

An object of the present invention is to provide for disconnecting the battery from the generator by means other than the reverse current relay which so controls the circuit of the magnet coil of the circuit breaker that, while the generator voltage is at a value sufficient for battery charging, the magnet coil remains energized and that, when generator voltage decreases to a value such that the battery can discharge, the magnet coil is deenergized.

In one embodiment of the invention, contacts in the circuit of the magnet coil of the circuit breaker are normally closed and an electromagnet becomes operative to open the contacts when current starts to flow from the battery. The electromagnet has two coils connected, respectively, in series with the battery in the charging line and in parallel with the battery. These coils are in bucking relation while current flows into the battery or it floats on the line and in assisting relation when current begins to flow from the battery to the generator.

In other embodiments, normally closed contacts in the circuit of the magnet coil of the circuit breaker are caused to be opened by an abnormal operation of a generator current regulator which occurs when, due to battery discharge to the generator, the current in its magnet coil becomes substantially greater than the maximum value for which the regulator is set.

Further objects and advantages of the present invention will be apparent from the following description, reference being had to the accompanying drawing, wherein preferred embodiments of the present invention are clearly shown.

In the drawing:

Figs. 1, 2 and 3 are wiring diagrams of three embodiments of the invention.

Referring to Fig. 1, a generator 10 having a field winding 11 charges a storage battery 12 through a circuit which includes a series coil 13 of a reverse current relay 15, contacts 21, 22, 23 (when closed) of a circuit breaker 20 and series coil 31 of a relay 30.

Reverse current relay 15 includes a shunt coil 14 which, like coil 13, surrounds a core 16 which, when sufficiently energized, causes the attraction of an armature against the upward biasing action of a spring blade 17a electrically connected with the charging line shown in heavy black and carrying a contact 18 adapted to engage a contact 19 connected with a magnet coil 26 of the circuit breaker 20. Coil 26 surrounds a core 25 which, when magnetized, effects attraction of an armature 24 against the biasing action of a spring blade 24a attached to the contact 22.

The relay 30 includes a shunt coil 32, which like coil 31, surrounds a core 33 which, when magnetized, effects attraction of an armature 34 against the biasing action of a leaf spring blade 34a connected with coil 26 and carrying a contact 35 normally engaging a contact 36 which is grounded.

The operation of the system shown in Fig. 1 is as follows: When the voltage of the generator attains such value that the generator is capable of charging the battery, core 16 becomes sufficiently magnetized to effect downward movement of the armature 17 thereby effecting the engagement of contacts 18 and 19 which are in series with the coil 26 of circuit breaker 20 and contacts 35 and 36 of relay 30 which are normally closed. Therefore, the closing of contacts 18 and 19 effects energization of coil 26 and contacts 21, 22 and 23 of circuit breaker 20 are connected. While the generator voltage is such as to effect battery charging or to cause the generator to float on the line, the coils 31 and 32 are in bucking relation so that the magnetism, if any, in the core 33 is insufficient to attract the armature 34 against the biasing action of blade 34a. If the voltage of the generator should decrease to a value such that the battery starts to discharge thereby reversing the direction of the current flow in coil 31, coils 31 and 32 are in assisting relation and the armature 34 moves down and contact 35 is separated from contact 36 thereby open circuiting the coil 26 of the circuit breaker 20 whereupon the blade 24a separates contact 22 from contacts 21 and 23 and battery discharge ceases.

In the embodiment shown in Fig. 2, contacts 35 and 36 of Fig. 1 are replaced by contacts 41 and 42 of a switch 40 having a spring blade 43 which carries a non-conducting bumper block 44. Blade 43 biases contact 41 upwardly into normal engagement with contact 42. Block 44 is located in the path of movement of the armature 53 of a current regulator 50 having a current coil 51 surrounding a core 52, one end of which is spaced from the armature 53. Armature 53 is biased upwardly by a leaf spring 54 so that it will normally engage a stop pin 55. Armature 53 carries the contact normally engaging a contact 57 carried by a leaf spring 58 which is grounded. Normally spring 58 is spaced from a stop pin 59. Contacts 56 and 57 normally short circuit a resistance 11r in series with the generator field winding 11. When the generator current output exceeds the value for which the regulator 50 is set, armature 53 moves down to effect separation of contacts 56, 57, thereby opening the short circuit around the resistance 11r which becomes effective to reduce field excitation and generator current output to a value slightly less than the upper limit and contacts 56, 57 reengage and generator current output increases. This cycle is repeated so long as the generator current output tends to exceed the upper limit. While the current regulator armature 53 is operating in the controlling range alternately to separate and reengage contacts 56—57, the contacts 41 and 42 remain in engagement. In case the relay 15 does not operate to effect disconnection of the battery when generator voltage suddenly decreases below charging voltage, current discharging from the battery so abnormally energizes the coil 51 of the current regulator as to cause the armature 53 to move below its normal current controlling range and engage block 44 and cause separation of contacts 41 and 42. Coil 26 of the circuit breaker 20 will then be open circuited and contact 22 will be separated from contacts 21 and 23.

The control of switch 40 after the manner of control by a vibratory current regulator can be effected by a carbon pile current regulator as shown in Fig. 3, provided the regulator armature has sufficient range of movement. In Fig. 3, the switch 40 is under control by a carbon pile regulator 60 having a current coil 61 surrounding a core 62 for attracting an armature 63 connected with a lever 64 pivoted at 65 and urged counterclockwise by a spring 66 connecting said lever with a fixed pin 67, thereby urging a movable pile electrode 68 connected with a field winding 11 toward a fixed electrode 69 to place discs of a carbon pile 70 under such compression that field current would be normally high. The normal range of current controlling movement of armature 63 is such that contacts 41 and 42 of switch 40 remain in engagement. In the event of failure of relay 15 to act in time to prevent battery discharge though the generator when the generator voltage falls suddenly to a value less than charging voltage, battery discharge effects such abnormal energization of coil 61 as to cause the armature 63 to engage block 44 and separate contacts 41 and 42 and thereby to cause deenergization of coil 26 of relay 20 and the separation of its contacts.

In each of the three embodiments of the present invention the auxiliary contacts (35, 36 in Fig. 1 and 41, 42 in Figs. 2 and 3) in the circuit of the coil 26 of the circuit breaker are normally closed. When current flows from the battery to the generator, an electromagnet is sufficiently energized to effect separation of these contacts. In Figs. 2 and 3, the electromagnet is that of the current regulator. In a system having no current regulator or one having a limited range of armature movement, an additional relay switch is provided as shown in Fig. 1.

While the embodiments of the present invention as herein disclosed, constitute preferred forms, it is to be understood that other forms might be adopted.

What is claimed is as follows:

1. A battery charging system comprising a storage battery, a generator, a circuit connecting the generator and battery and including a circuit breaker having normally open contacts and a magnet coil for closing the contacts to connect the generator and battery, a circuit breaker relay having normally open contacts, spring means for separating them, a voltage coil connected across the generator terminals and a current coil in series with the generator, the circuit breaker contacts and the battery and operating in assisting relation to the voltage coil when the circuit breaker contacts are closed while current flows from the generator to the battery, a control circuit for the circuit breaker magnet coil which is connected across the generator terminals and which comprises, in series, the normally open contacts of the circuit breaker relay, the magnet coil of the circuit breaker and a pair of normally closed contacts, spring means for maintaining engagement of the normally closed contacts and means for causing separation of the normally closed contacts only in response to a certain amount of battery discharge current to effect deenergization of the circuit breaker magnet coil whereby the battery is disconnected from the generator by opening of the circuit breaker contacts regardless of the fact that, due to rapid reduction in generator voltage, there might be such rapid increase in battery discharge current that the circuit breaker relay might not operate to open its contacts.

2. A battery charging system comprising a storage battery, a generator, a circuit connecting the generator and battery and including a circuit breaker having normally open contacts and a magnet coil for closing the contacts to connect the generator and battery, a circuit breaker relay having normally open contacts, spring means for separating them, a voltage coil connected across the generator terminals and a current coil in series with the generator, the circuit breaker contacts and the battery and operating in assist- ing relation to the voltage coil when the circuit breaker contacts are closed while current flows from the generator to the battery, a control circuit for the circuit breaker magnet coil which is connected across the generator terminals and which comprises, in series, the normally open contacts of the circuit breaker relay, the magnet coil of the circuit breaker and a pair of normally closed contacts, spring means for maintaining engagement of the normally closed contacts, an electromagnet having a coil in circuit between the generator and the battery and ineffective during battery charging to separate the normally closed contacts and rendered effective only in response to a certain amount of battery discharge current to cause separation of the normally closed contacts to effect deenergization of the circuit breaker magnet coil whereby the battery is disconnected from the generator by opening of the circuit breaker contacts regardless of the fact that, due to rapid reduction in generator voltage, there might be such rapid increase in battery discharge current that the circuit breaker relay might not operate to open its contacts.

3. A system according to claim 2 in which the last mentioned electromagnet comprises an armature connected with one of the contacts of the normally closed contacts and two coils respectively in series and in shunt with the battery and in bucking relation while the battery is being charged or floats on the line and in assisting relation when the generator voltage falls below battery voltage and the battery discharges to the generator.

4. A system according to claim 2 in which the last mentioned electromagnet is part of a current regulator whose armature moves substantially beyond its normal range of regulating movement when the current flow in its magnet coil is substantially greater than maximum controlling value, and in which means are provided for causing separation of the normally closed contacts in response to abnormal movement of the regulator armature when the battery discharges to the generator.

WILLIAM J. RADY.
LYMAN A. RICE.

REFERENCES CITED

The following references are of record in the file of this patent:

UNITED STATES PATENTS

| Number | Name | Date |
|---|---|---|
| 374,673 | Griscom | Dec. 13, 1887 |
| 571,952 | Moskowitz | Nov. 24, 1896 |
| 1,062,918 | Jepson et al. | May 27, 1913 |
| 1,070,456 | Gugler | Aug. 19, 1913 |
| 1,469,736 | Sullivan | Oct. 2, 1923 |
| 1,692,216 | Leece | Nov. 20, 1928 |
| 1,875,041 | Leece | Aug. 30, 1932 |
| 1,920,096 | McNeil | July 25, 1933 |
| 1,973,804 | Frese | Sept. 18, 1934 |
| 2,179,962 | Scott | Nov. 14, 1939 |
| 2,306,893 | Menzel | Dec. 29, 1942 |
| 2,455,060 | Holmes | Nov. 30, 1948 |
| 2,469,092 | Webb | May 3, 1949 |